United States Patent
Kageyama

(10) Patent No.: US 7,690,369 B2
(45) Date of Patent: Apr. 6, 2010

(54) FUEL PRESSURE CONTROLLING DEVICE OF ENGINE

(75) Inventor: Yuzo Kageyama, Isehara (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 12/339,957

(22) Filed: Dec. 19, 2008

(65) Prior Publication Data

US 2009/0164101 A1 Jun. 25, 2009

(30) Foreign Application Priority Data

Dec. 25, 2007 (JP) ............................. 2007-332339

(51) Int. Cl.
*F02D 41/30* (2006.01)
(52) U.S. Cl. ...................... 123/676; 123/295; 60/286
(58) Field of Classification Search ................ 123/295, 123/435, 676; 60/286; 701/103
See application file for complete search history.

(56) References Cited

U.S. PATENT DOCUMENTS

| | | | | |
|---|---|---|---|---|
| 5,975,046 A | * | 11/1999 | Kaneko et al. | 123/300 |
| 7,137,247 B2 | * | 11/2006 | Koga et al. | 60/295 |
| 7,533,518 B2 | * | 5/2009 | Kurtz et al. | 60/285 |
| 2009/0165446 A1 | * | 7/2009 | Haseyama et al. | 60/286 |

FOREIGN PATENT DOCUMENTS

JP 10-131786 5/1998

* cited by examiner

*Primary Examiner*—Hai H Huynh
(74) *Attorney, Agent, or Firm*—Drinker Biddle & Reath LLP

(57) ABSTRACT

A fuel pressure controlling device for an engine is provided including a fuel injection device, an ignition device, a catalyst for removing pollutants from engine exhaust. A controller selects a combustion mode from at least a homogeneous combustion mode fuel is injected the intake stroke and the fuel is ignited before compression top dead center. The fuel injection device injects the fuel based on a target fuel pressure according to the selected combustion mode. The controller detects whether or not a request is present for raising the temperature of the catalyst. In the homogenous combustion mode, when a request is present, the target fuel pressure is set to a first target fuel pressure, and when a request is not present, the target fuel pressure is set to a second target fuel pressure, the second target fuel pressure being lower than the first target fuel pressure.

15 Claims, 9 Drawing Sheets

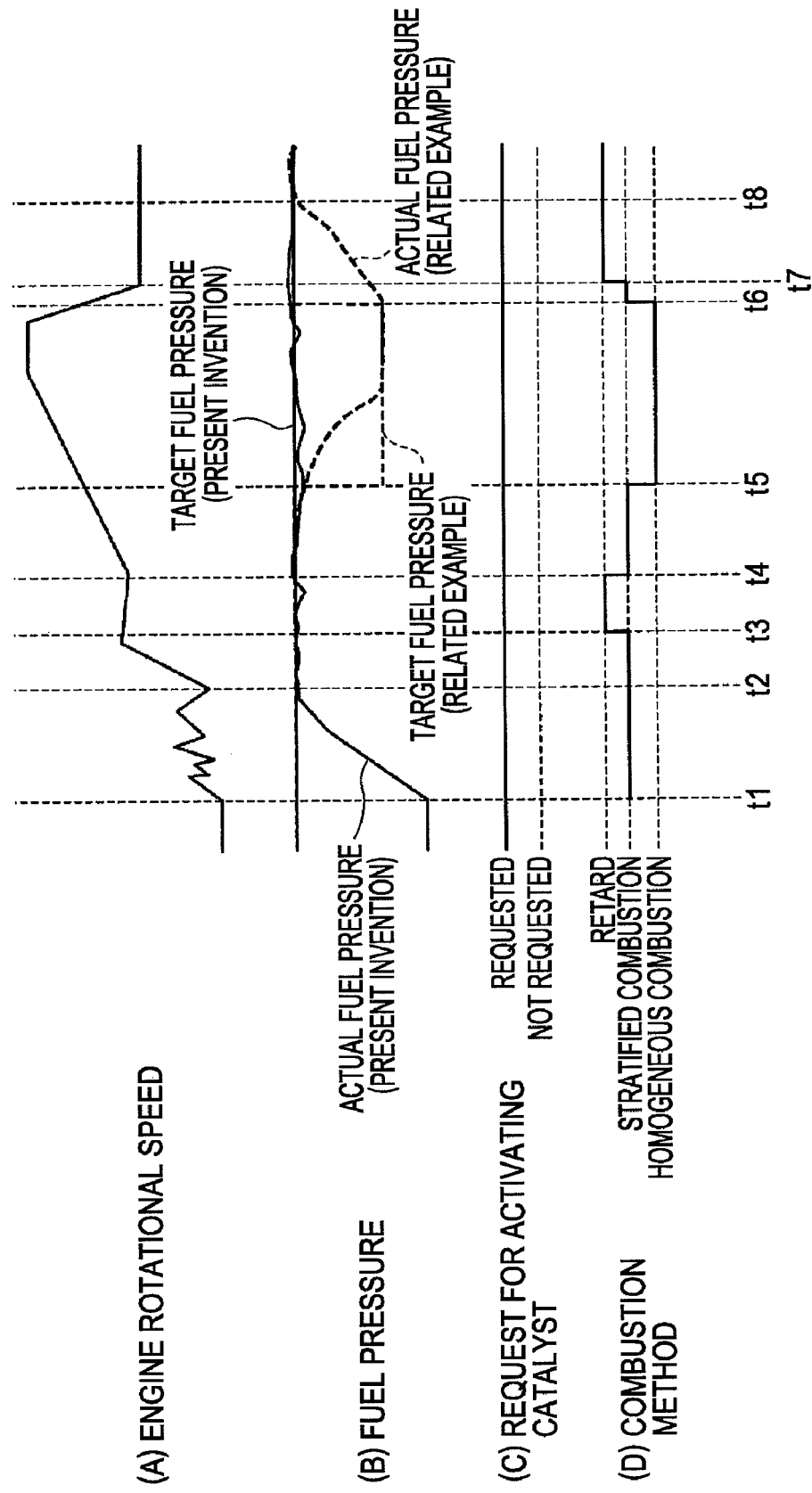

FUEL PRESSURE CONTROLLING DEVICE OF ENGINE

CROSS-REFERENCE TO RELATED APPLICATIONS

This application claims priority to Japanese Patent Application No. P2007-332339 filed Dec. 25, 2007, which is incorporated by reference herein in the entirety.

BACKGROUND OF THE INVENTION

1. Field of the Invention

The present invention relates to a fuel pressure controlling device of an engine.

2. Description of the Related Art

A related engine controlling device is available including a fuel pressure controlling device that sets the pressure of fuel injected into a cylinder of the engine by a fuel injector when the engine is operating in a stratified combustion mode to a value that is higher than the pressure of fuel injected by the fuel injector when the engine is operating in a homogeneous combustion mode.

However, in the above-described related fuel pressure controlling device of an engine, even if a command is given to switch the combustion mode from homogeneous combustion to stratified combustion (which excels in exhaust performance), the combustion mode cannot be switched until the actual fuel pressure reaches a target fuel pressure for the stratified combustion mode. Therefore, the exhaust performance is deteriorated.

SUMMARY OF THE INVENTION

An object of the present invention is make it possible to prevent exhaust performance from deteriorating by reducing the time from when a request is detected to be present to switch combustion methods to when the combustion method is actually switched.

In one embodiment of the present invention, a fuel pressure controlling device for a four stroke engine having a cylinder is provided. The device includes a fuel injection device for injecting fuel into the cylinder, an ignition device for igniting a mixture of the injected fuel and air, a catalyst for removing pollutants from exhaust emitted by the engine, and a controller for controlling the fuel injection device and the ignition device, the controller being configured to select a combustion mode of the engine from at least a homogeneous combustion mode in which the fuel injection device injects the fuel during the intake stroke of the cylinder and the ignition device ignites the fuel before compression top dead center. The controller is configured to control the fuel injection device to inject the fuel based on a target fuel pressure according to the selected combustion mode, and to detect whether or not a request is present for raising the temperature of the catalyst. In the homogenous combustion mode, when the controller detects that a request is present for raising the temperature of the catalyst, the controller sets the target fuel pressure to be a first target fuel pressure, and when the controller detects that a request is not present for raising the temperature of the catalyst, the controller sets the target fuel pressure to be a second target fuel pressure, the second target fuel pressure being lower than the first target fuel pressure.

In another embodiment of the present invention, a method of controlling the fuel pressure supplied to a four stroke engine having a cylinder is provided. The method includes selecting a combustion mode of the engine from at least a homogenous combustion mode in which a fuel injection device injects fuel into the cylinder during the intake stroke of the engine and an ignition device ignites the fuel before compression top dead center, detecting whether or not a request is present for raising the temperature of a catalyst, the catalyst being provided for removing pollutants from exhaust emitted by the engine, injecting the fuel based on a target fuel pressure according to the selected combustion mode, and setting the target fuel pressure. In the homogenous combustion mode, when a request is detected to be present for raising the temperature of the catalyst, the target fuel pressure is set to be a first target fuel pressure, and when a request is not detect to be present for raising the temperature of the catalyst, the target fuel pressure is set to be a second target fuel pressure, the second target fuel pressure being lower than the first target fuel pressure.

In another embodiment of the present invention, a fuel pressure controlling device for a four stroke engine having a cylinder is provided. The device includes fuel injection means for injecting fuel into the cylinder, ignition means for igniting a mixture of the injected fuel and air, a catalyst for removing pollutants from exhaust emitted by the engine, and control means for controlling the fuel injection means and the ignition means, the control means selecting a combustion mode of the engine from at least a homogeneous combustion mode in which the fuel injection means injects the fuel during the intake stroke of the cylinder and the ignition means ignites the fuel before compression top dead center, the control means further detecting whether or not a request is present for raising the temperature of the catalyst. The fuel injection means is controlled to inject the fuel based on a target fuel pressure according to the selected combustion mode. In the homogenous combustion mode, when a request is present for raising the temperature of the catalyst, the target fuel pressure is set to be a first target fuel pressure, and when a request is not present for raising the temperature of the catalyst, the target fuel pressure is set to be a second target fuel pressure, the second target fuel pressure being lower than the first target fuel pressure.

BRIEF DESCRIPTION OF THE DRAWINGS

The accompanying drawings, which are incorporated herein and constitute part of this specification, illustrate preferred embodiments of the invention, and together with the general description given above and the detailed description given below, serve to explain features of the invention.

FIG. 10 is a time chart illustrating a sequence of operation of a fuel pressure controlling device of the present invention.

DESCRIPTION OF THE PREFERRED EMBODIMENTS

An embodiment of the present invention will be described in detail below with reference to the accompanying drawings.

Figure 1:
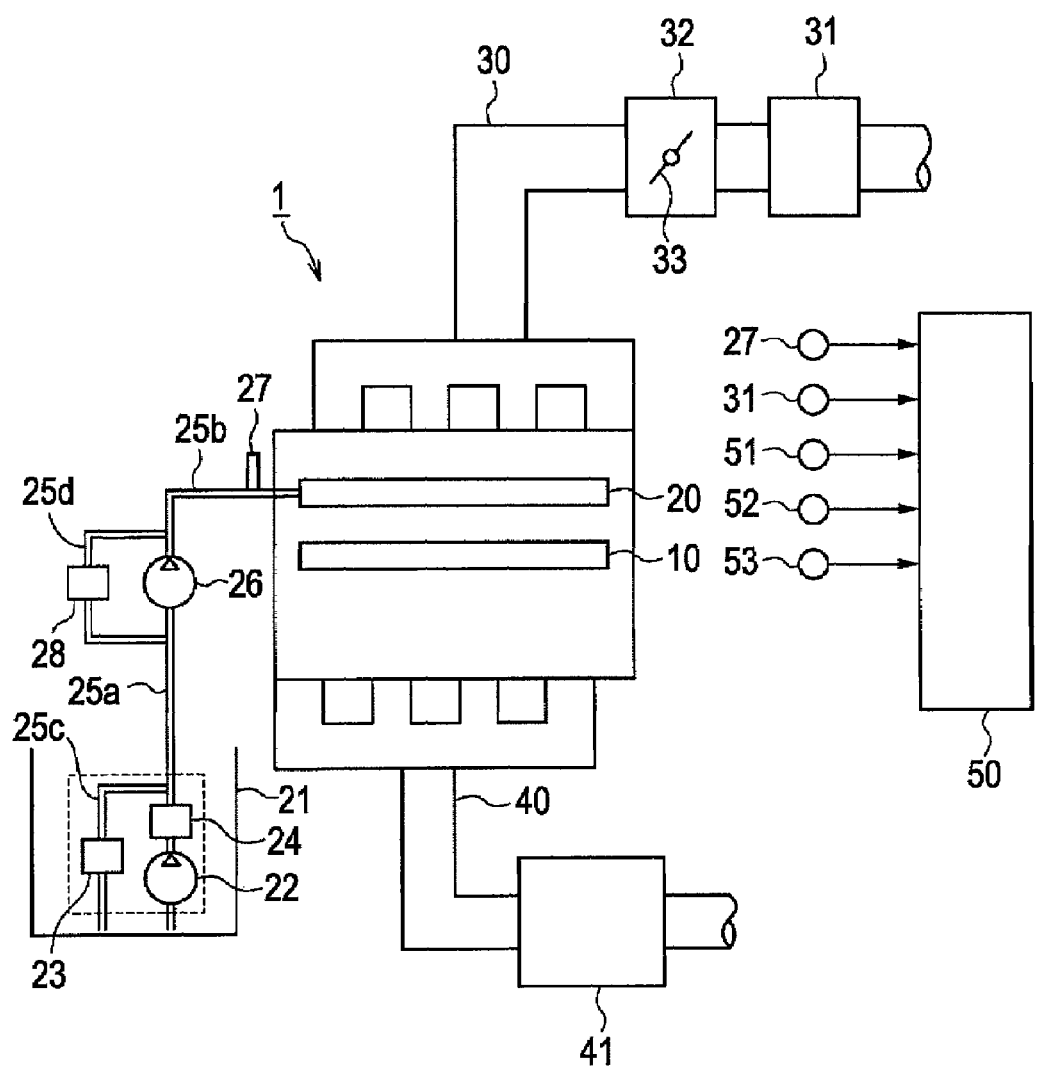
FIG. 1 shows a direct cylinder fuel-injection spark-ignition engine system including an embodiment of the fuel pressure controlling device of the present invention.

FIG. 1 shows a system including a fuel pressure controlling device of a direct cylinder fuel-injection spark-ignition engine 1 according to an embodiment of the present invention. The engine 1 comprises an ignition device 10, a fuel injection device 20, an intake path 30, and an exhaust path 40. The engine 1 is, for example, a four stroke engine, each cylinder having an intake stroke, which air is drawn into the cylinder as the piston moves to expand volume in the cylinder while intake valve(s) are open, a compression stroke, in which air is compressed in the cylinder as the piston moves to decrease the volume in the cylinder while intake and exhaust valves are closed, a expansion stroke, during which a fuel-air mixture is combusted to force the piston to move to expand the volume in the cylinder while the intake and exhaust valves are closed, and an exhaust stroke, in which combustion products are forced out of the cylinder as the piston moves to decrease the volume in the cylinder while the exhaust valve(s) are open. As will be discussed herein, fuel can be injected into the cylinder near the end of the compression stroke, exactly in between the compression and expansion strokes, or near the start of the expansion stroke. Also, it is noted that the valve timing can be adjusted to depart from the typical valve states described in this paragraph.

The ignition device 10, for example a spark plug, ignites a mixture of fuel and air that is compressed in each cylinder. The fuel injection device 20 directly injects fuel into each cylinder by a high pressure injector. Fuel that is supplied to the fuel injection device 20 is stored in a fuel tank 21. An electric low pressure fuel pump 22, a low pressure regulator 23, and a fuel filter 24 are built in the fuel tank 21 so as to be integrally formed into a module structure.

The fuel stored in the fuel tank 21 is drawn out by the low pressure fuel pump 22, and is discharged from the low-pressure fuel pump 22. The discharged low pressure fuel is filtered through the fuel filter 24, passes through a low pressure fuel path 25a, and is supplied to a high pressure fuel pump 26. The fuel discharged from the high pressure fuel pump 26 is supplied to the fuel injection device 20 through a high pressure fuel path 25b. The high-pressure fuel path 25b is provided with a fuel-pressure sensor 27 that detects fuel pressure.

A high pressure regulator 28 is provided in a return path 25d that connects the high pressure fuel path 25b and the low pressure fuel path 25a to each other and that returns the fuel from the high pressure fuel path 25b to the low pressure fuel path 25a. Based on a signal from the fuel pressure sensor 27, using the high pressure regulator 28, the fuel pressure of the high pressure fuel path 25b continuously changes an opening area of the return path 25d, so that feedback control is performed with regard to a target fuel pressure in accordance with the operation state of the engine 1.

The fuel pressure of the fuel flowing through the low pressure fuel path 25a is adjusted by a low pressure regulator 23 provided at a return path 25c that returns the fuel to the fuel tank 21. The high pressure fuel pump 26 is a plunger-type fuel pump that is driven by the engine 1 and that can discharge the high pressure fuel when the engine has low rotational speed.

The intake path 30 is a path for supplying air to each cylinder. From an upstream side, the intake path 30 is provided with an air flow sensor 31 and an electronic control throttle 32. The air flow sensor 31 detects an intake quantity being drawn into the engine 1. An electronic control throttle 32 drives a throttle valve 33 based on a control signal from a controller 50, to control a throttle opening in accordance with the operation state of the engine 1.

The exhaust path 40 is a path for exhausting exhaust gas (i.e., the products of fuel-air combustion from each cylinder) to the outside. The exhaust path 40 is provided with a catalytic converter 41. The catalytic converter 41 includes a catalyst that removes harmful substances, such as unburned hydrocarbons, carbon monoxide, and nitrogen oxides, from the exhaust.

In the present embodiment, the engine 1 has a plurality of cylinders. The embodiment of FIG. 1 shows an engine 1 having four cylinders arranged in-line. Each cylinder is coupled separately with the intake path 30 and the exhaust path 40. It is understood that the engine controlling device of the present invention is equally applicable to engines having any number of cylinders in any arrangement.

The controller 50 is a microcomputer comprising a central processing unit (CPU), a read only memory (ROM), a random access memory (RAM), and an input/output interface (I/O interface). In addition to signals from the air flow sensor 31 and the fuel-pressure sensor 27, signals from, for example, a water temperature sensor 51, a crank angle sensor 52, and an idle switch 53 are input to the controller 50.

The water temperature sensor 51 detects the water temperature of the engine 1. The crank angle sensor 52 detects the rotational speed of the engine 1 and a reference position of each cylinder. The crank angle sensor 52 outputs a position signal (POS signal) with each unit rotational angle of the engine crank shaft. The crank angle sensor 52 also outputs a reference signal (REF signal) at a reference position of the crank shaft. The controller 50 calculates the ignition timing and the fuel injection timing based on, for example, the POS signal and the REF signal. The idle switch 53 detects whether or not the engine 1 is in an idle operation as a result of being switched on when an accelerator pedal is not used.

In accordance with the operation state of the engine 1, the combustion method can be switched between stratified combustion and homogeneous combustion. The term "stratified combustion" refers to combustion that is carried out by injecting fuel during the compression stroke of the piston and igniting the resultant fuel-air mixture before the piston reaches compression top dead center and while the fuel is unevenly distributed near the ignition device 10. The term "homogeneous combustion" refers to combustion that is performed by injecting fuel during the intake stroke of the piston and forming a gas mixture having a substantially uniform air-fuel ratio in the entire combustion chamber which is then ignited when the piston is near compression top dead center at a crank angle between near the end of the compression stroke and near the start of the expansion stroke.

In one embodiment, stratified combustion is performed after starting the engine (stratified combustion engine start-up). Compared to homogeneous combustion in which fuel is homogeneously spread in each cylinder, stratified combustion can restrict production of wall flow in each cylinder. Therefore, it is desirable to start the engine by stratified combustion when there is a request for activating the catalyst. Starting the engine by stratified combustion can use a fuel injection amount smaller than that when starting the engine by homogeneous combustion. As a result, the catalyst can be increased in temperature more quickly by after-burning hydrocarbons not burned in the fuel-rich zones near the ignition device and that amount of unburned hydrocarbons emitted from the catalytic converter can be reduced due to the overall lean mixture that is combusted, making it possible to improve exhaust performance.

Figure 2:
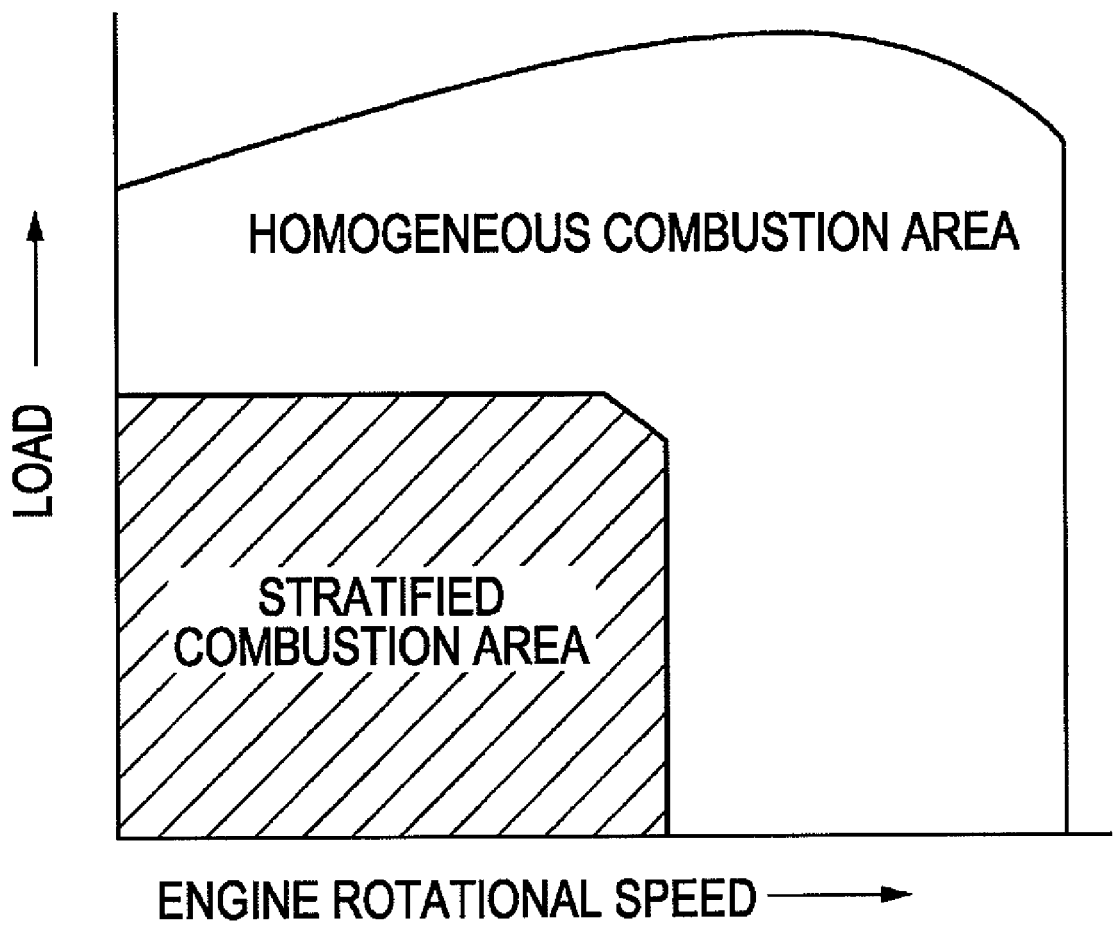
FIG. 2 is a fuel pressure map depicting a relationship between engine rotational speed and engine load for determining a combustion mode.

When an engine is operating above an idle rotational speed (e.g., when a vehicle in which the engine is mounted is traveling ordinarily), as shown in FIG. 2, stratified combustion is performed in a predetermined operation area of low speed, low load operation, to yield good gas mileage. Otherwise, homogeneous combustion is performed in a predetermined operation area of low speed, high load operation, or high speed, high load operation, to yield high engine power output.

In one embodiment, when the engine is in a predetermined operating state (e.g., during idle operation when the engine is cold), the combustion mode is switched to retarded combustion, which is a different state or method of combustion from the aforementioned ordinary stratified combustion and homogeneous combustion. Retarded combustion is a combustion method in which an ignition timing is set at or following compression top dead center and in which fuel is injected before the ignition by the ignition device 10. The timing at which the ignition device 10 initiates ignition of the fuel-air mixture is referred to as ignition timing.

Retarded combustion is performed to improve the emission performance of the engine exhaust. Retarded combustion results is a slight increase in the amount of unburned hydrocarbons being exhausted by the engine; those unburned hydrocarbons are then after-burned in the catalytic converter, releasing the heat of combustion to activate the catalyst in the catalyst more quickly. Thus, at an early stage of operation when the engine is cold, exhaust performance can be effective improved by retarding the ignition timing. To maximize the effect, ignition is preferably performed at and following compression top dead center.

Figure 3:
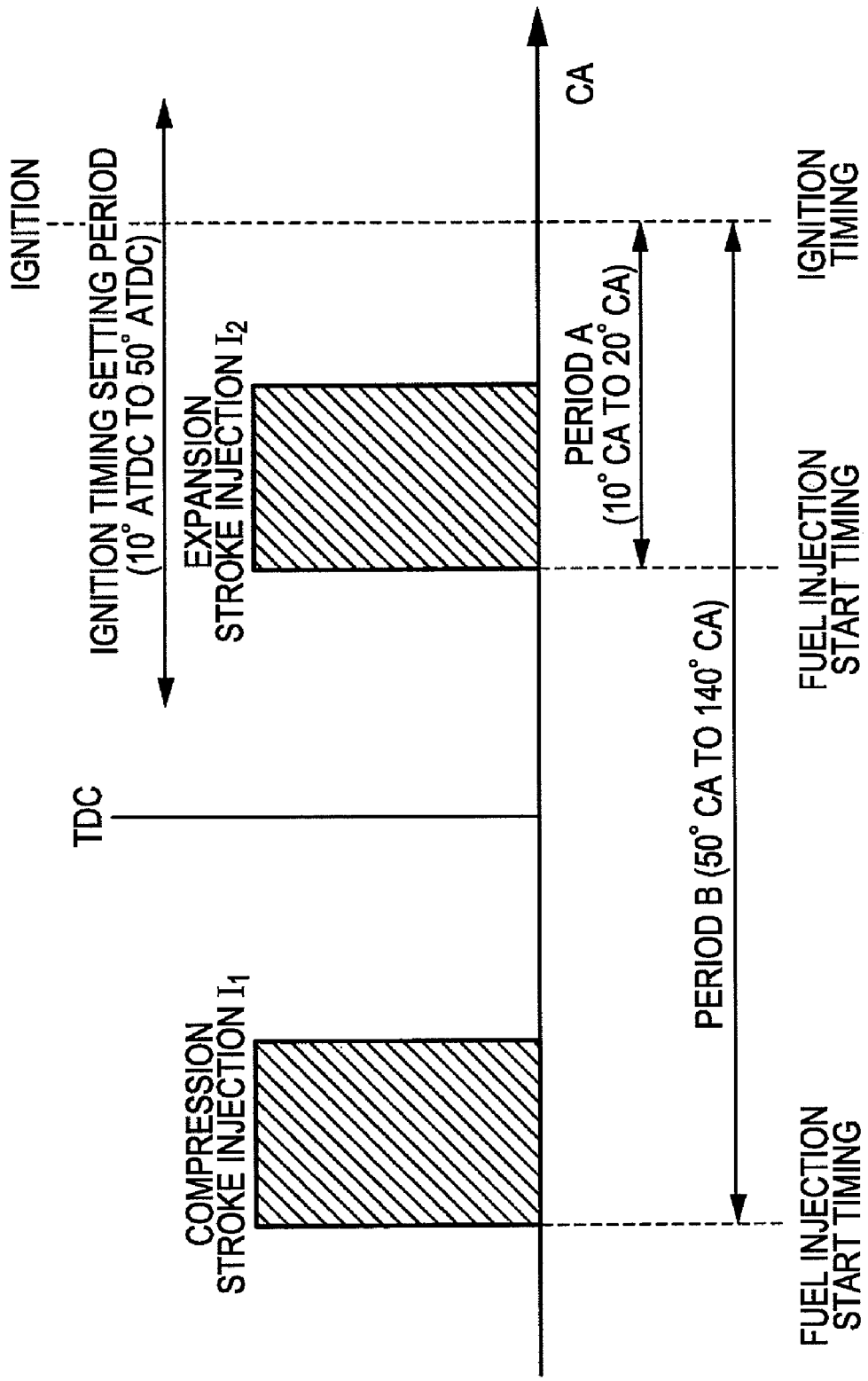
FIG. 3 illustrates an example of an ignition timing and a fuel injection timing for retarded combustion.

A retarded combustion ignition timing and fuel injection period are described with reference to FIG. 3, which illustrates an example of the ignition timing and the fuel injection timing of retarded combustion as a function of crank angle (indicated as "CA" in the figure). As shown in FIG. 3, the ignition timing is set from ten degrees after top dead center (10° ATDC) to fifty degrees after top dead center (50° ATDC) following compression top dead center. The fuel injection timing is set so that fuel is separately injected twice, once during the intake stroke and again during the expansion stroke. The fuel injection timing of a first fuel injection $I_1$ that is performed during the compression stroke is set so that a period B (measured form the start of the first fuel injection $I_1$ until ignition) spans a crank angle range from 50 degrees (50° CA) to 140 degrees (140° CA). The fuel injection timing of a second fuel injection $I_2$ that is performed in the expansion stroke is set so that a period A (measure from the start of the second fuel injection $I_2$ until ignition) spans a crank angle range from 10 degrees (10° CA) to twenty degrees (20° CA).

By setting the ignition timing from 10° ATDC to 50° ATDC, and considerably retarding the ignition timing, a sufficient after-burning effect can be obtained in the catalytic converter for activating the catalyst at an early stage and thereby reducing the exhaust density of hydrocarbons and other pollutants emitted to the outside after the catalytic converter. In other words, some fuel remains unburned when leaving the engine and travels with the exhaust to the catalytic converter. The catalytic converter is hot enough to cause the fuel to combust, which causes the temperature of the catalytic converter to rapidly increase and facilitates reduction of the hydrocarbons in the exhaust expelled to the outside.

For stabilizing combustion during ignition at or following compression top dead center, the combustion period needs to be reduced. Therefore, it is necessary to increase the combustion speed (i.e., the flame speed). One way to increase the combustion speed is by increasing cylinder turbulence. Cylinder turbulence can be generated and/or increased by fuel-spray energy as fuel is injected at a high pressure into each cylinder. When the fuel (and/or air) is injected into the cylinder, the molecules move very fast in response to the fast influx of the high pressure fuel (and/or air), thereby causing the contents of the cylinder to become turbulent. Turbulent fuel/air mixtures burn faster than non-turbulent mixtures.

For retarded combustion according to one embodiment, the cylinder turbulence that is generated by a first fuel injection $I_1$, performed during the compression stroke before the compression top dead center, gradually decays at or following compression top dead center. Therefore, a second fuel injection $I_2$ is carried out during the expansion stroke following compression top dead center. Therefore, the residual cylinder turbulence that is generated by the first fuel injection $I_1$ can be increased by way of the second fuel injection $I_2$. Therefore, even if the ignition timing is considerably retarded, fuel is injected immediately prior to ignition by the ignition device 10, to increase the cylinder turbulence, thereby increasing the combustion speed. Therefore, combustion can be stabilized.

Figure 4:
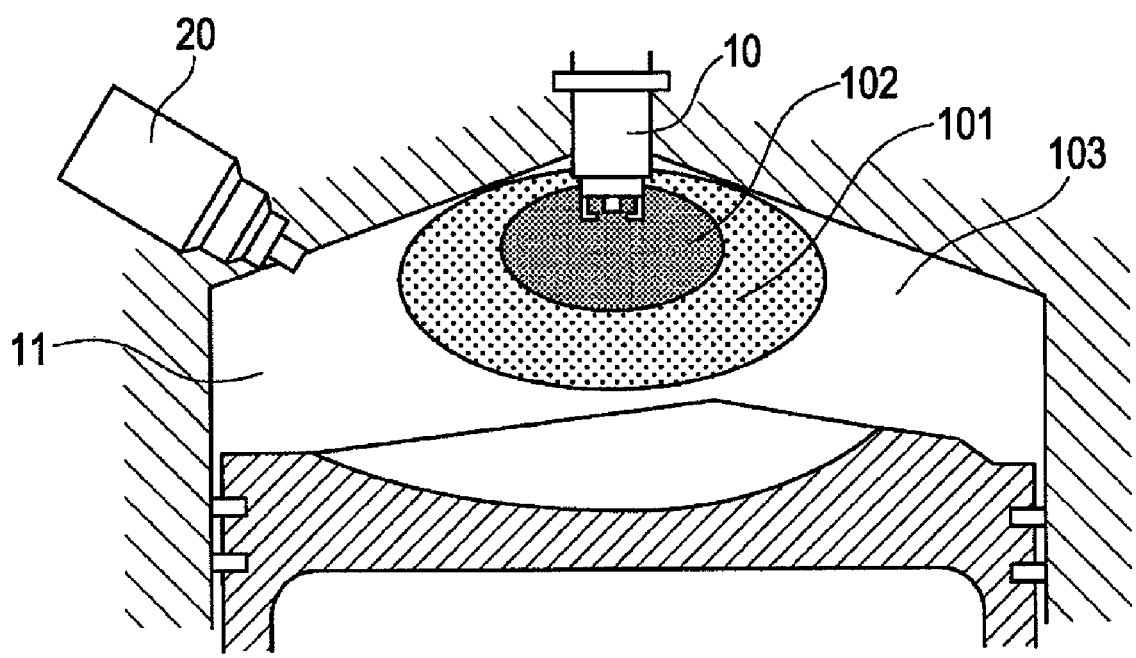
FIG. 4 illustrates schematically a state in which a gas mixture is formed in an engine combustion chamber when the retarded combustion is performed.

FIG. 4 illustrates a state in which a gas mixture is formed in the combustion chamber when the retarded combustion is performed. As shown in FIG. 4, the first fuel injection $I_1$, performed during the compression stroke, causes a rich first mixture mass 101 having a relatively high fuel-air ratio to be formed near the ignition device 10. The second fuel injection $I_2$, performed during the expansion stroke, causes a richer second mixture mass 102 to be formed in the interior of the rich first mixture mass 101, which was formed by the first fuel injection $I_1$. A gas layer 103, to which a substantial amount of fuel has not spread, is formed outside of the rich first mixture mass 101. The air-fuel ratio of the entire fuel chamber 11 is set to slightly lean (i.e., the air-fuel ratio of the entire fuel chamber 11 is preferably set in the range of about 16 to about 17) compared with a theoretical (stoichiometric) air-fuel ratio (i.e., an air-fuel ratio of about 14.7).

In the stratified combustion state, the second mixture mass 302 is ignited by the ignition device 10, so that retarded combustion is performed. The fuel-rich layers 302 and 301 cause some of the hydrocarbons to remain uncombusted, while the fuel-lean overall mixture provides the oxygen necessary for afterburning of the unburned hydrocarbons. For improving exhaust performance, it is desirable that, when the engine is cold, the combustion method be quickly switched to retarded combustion, to activate the catalytic converter at an early stage.

When stratified combustion and retarded combustion are performed, fuel is injected during the compression stroke. In contrast, when homogeneous combustion is performed, the fuel is injected only during the intake stroke. Therefore, when stratified combustion and retarded combustion are performed, the fuel needs to be injected at a higher fuel pressure than when homogeneous combustion is performed.

Therefore, even if a request is detected to be present to switch the combustion mode from homogeneous combustion to stratified combustion or to retarded combustion, the combustion mode cannot be switched until the actual fuel pressure reaches a target fuel pressure that allows stratified combustion or retarded combustion to be performed (e.g., the target fuel pressure can be the pressure in the cylinder at compression top dead center). This causes a time lag to occur between when a request is detected to be present to switch the combustion mode and when the combustion mode is actually switched. Retarded combustion is performed to increase exhaust performance (i.e., reduction of pollutants emitted from the catalytic converter) by increasing exhaust temperature and activating the catalyst in the catalytic converter at an early stage. Therefore, when a time lag occurs after a request for switching is present but before the combustion mode can actually be switched to retarded combustion, due to waiting until the fuel pressure is raised, the exhaust performance is correspondingly worsened.

Accordingly, in one embodiment, in order reducing such a time lag when a request is detected to be present to activate the catalyst at an early stage, the target fuel pressure for homogeneous combustion is set to a high value. Thus, when a command is given to switch to retarded combustion, the combustion mode can be immediately switched. A fuel pressure controlling operation of the engine 1 for setting the target fuel pressure, according to an embodiment of the present invention, is as follows.

Figure 5:
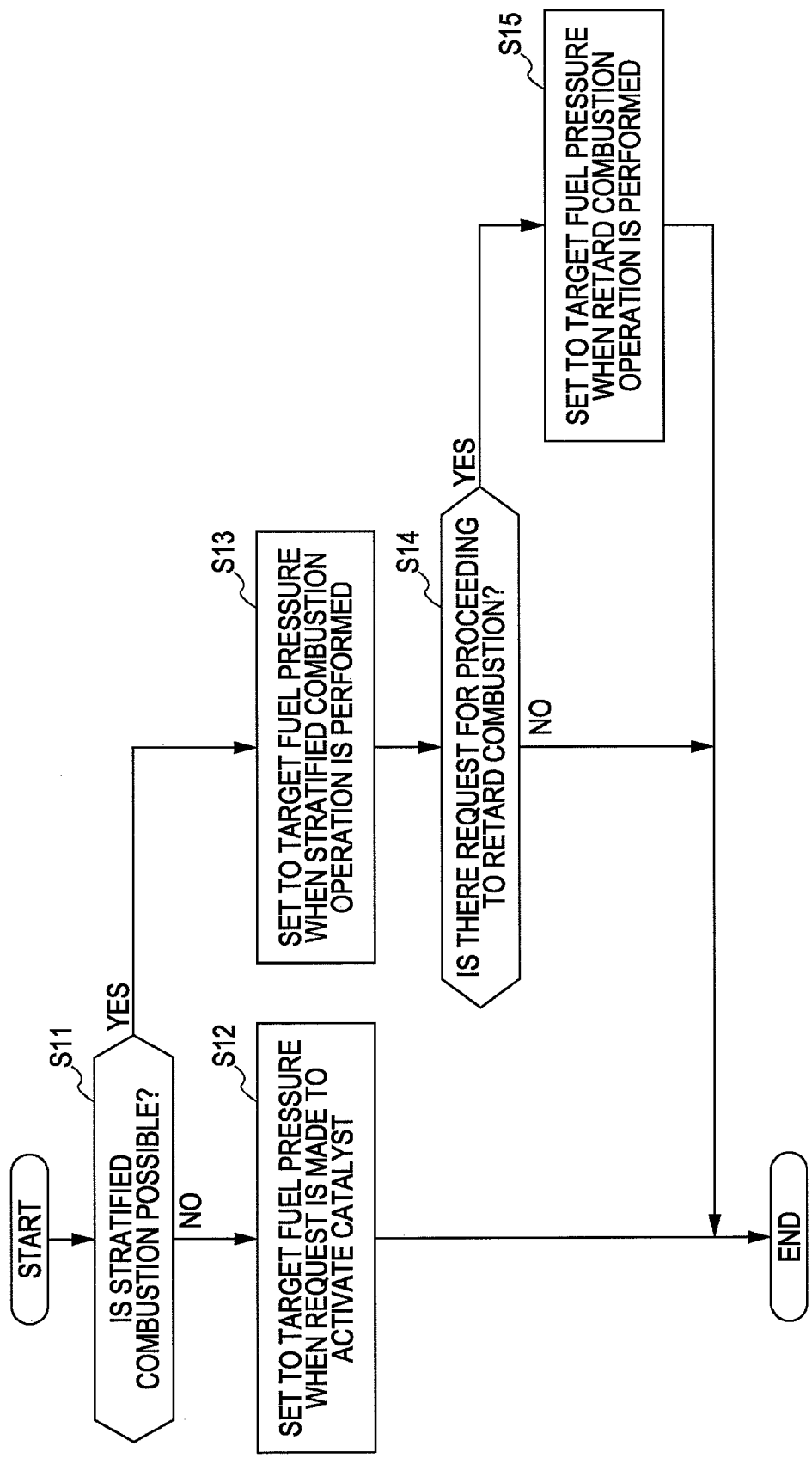
FIG. 5 is a flowchart illustrating a sequence of operation of a fuel pressure controlling device of the present invention when the engine is started and when the engine is in idle operation.

A fuel-pressure setting controlling operation of the engine 1 when the engine 1 is started and when the engine 1 is in idle operation will be described below. FIG. 5 is a flowchart illustrating an operation of the fuel pressure controlling device of the engine when the engine is started and when the engine is in idle operation. The controller 50 repeatedly executes this routine at a predetermined computation period.

In Step S11, the controller 50 determines whether or not stratified combustion operation is possible. When the engine 1 is in a very cold state, or when the water temperature of the engine is less than or equal to a predetermined temperature, it is difficult to perform stratified combustion. Therefore, when the water temperature of the engine is less than the predetermined temperature, the controller causes the process to proceed to Step S12 to execute homogeneous combustion. In contrast, when the water temperature of the engine is higher than the predetermined temperature, the controller causes the process to proceed to Step S13 to execute stratified combustion.

Figure 6:
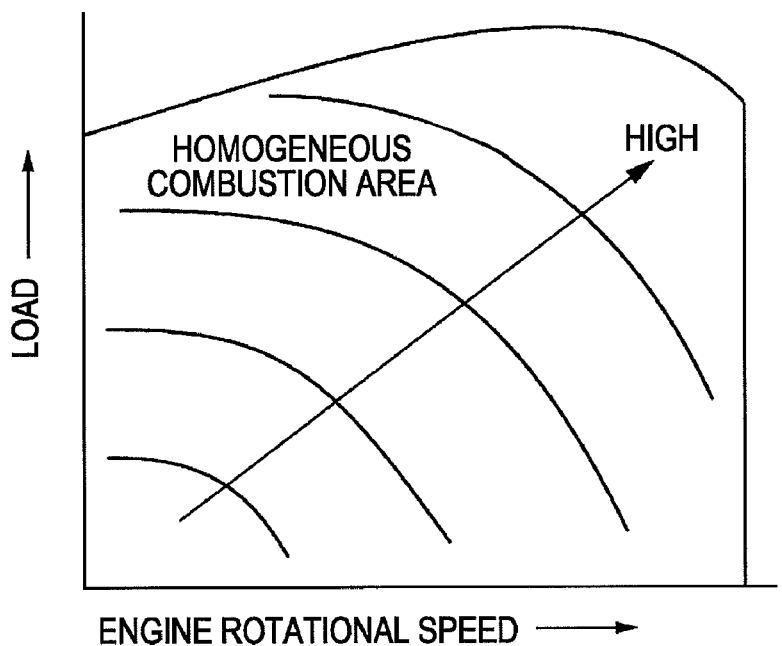
FIG. 6 is a fuel pressure map for homogeneous combustion.
Figure 7:
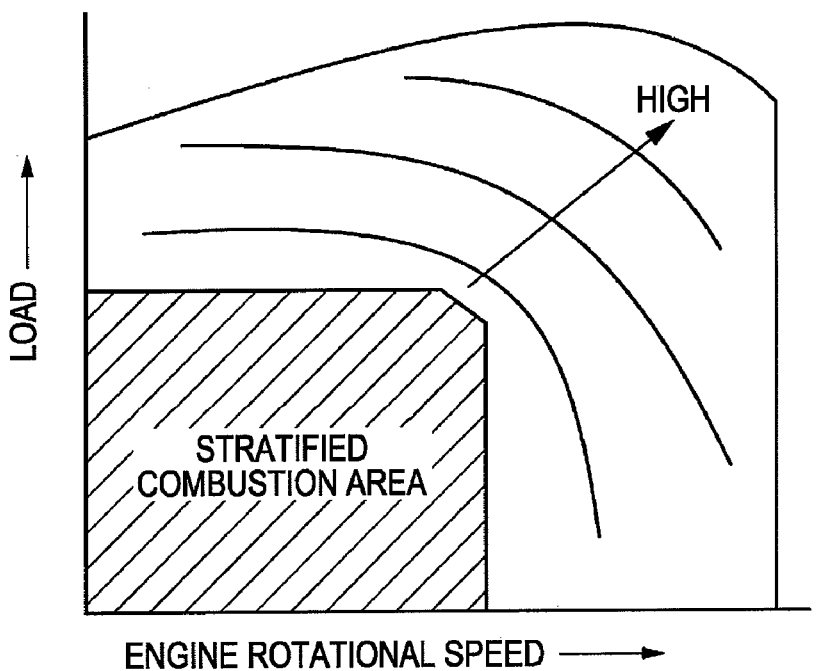
FIG. 7 is a fuel pressure map for stratified combustion.

In Step S12, the controller 50 sets a target fuel pressure to be a target fuel pressure for when a request for activating the catalyst is present. In the embodiment, the target fuel pressure is set with reference to the fuel pressure map for stratified combustion as shown in FIG. 7, but without referring to the fuel pressure map for homogeneous combustion as shown in FIG. 6. When the process proceeds to Step S12, the engine is in a cold state, so that the controller 50 can essentially determine that a request for activating the catalyst at an early stage is present. Therefore, even when homogeneous combustion is to be performed, setting the target fuel pressure by referring to the fuel pressure map for stratified combustion makes it possible to switch the combustion mode without a time lag when a command is given to switch from homogeneous combustion to retarded combustion.

In the fuel pressure map for homogeneous combustion shown in FIG. 6, the higher the load and/or the higher the engine rotational speed, the higher the fuel pressure. In contrast, in the fuel pressure map for stratified combustion shown in FIG. 7 shows a stratified combustion region at low loads and low engine rotational speeds, and a homogeneous combustion region at higher loads and/or higher rotational speeds. In the stratified combustion region, a constant higher target fuel pressure is set than in the homogenous combustion region. This is because in the stratified combustion region, fuel is injected during the compression stroke, whereas, in the homogeneous combustion region, fuel is injected during the intake stroke. Therefore, the target fuel pressure that is set during low speed, low load operation (i.e., operation calling for stratified combustion) may be greater than the target fuel pressure that is set during higher speed and/or higher load operation (i.e., operation calling for homogeneous combustion). For simplification, the fuel pressure maps shown in FIGS. 6 and 7 are maps in which the target fuel pressures at the respective homogeneous combustion areas are divided into approximately 3 to 4 stages. However, the target fuel pressures may be further divided.

In Step S13, the controller 50 sets the target fuel pressure to a target fuel pressure for stratified combustion. More specifically, the target fuel pressure is set with reference to the fuel pressure map for stratified combustion shown in FIG. 7. In Step S14, the controller 50 determines whether or not a request for proceeding to retarded combustion is present. That is, the controller detects whether or not a request for activating the catalyst at an early stage is present when the engine is in idle operation after the engine rotational speed reaches a predetermined rotational speed. When the controller detects that a request for proceeding to retarded combustion is present, the process proceeds to Step S15, whereas if the controller 50 detects that a request for proceeding to retarded combustion is not present, the current routine ends.

To determine whether or not there is a request for activating the catalyst at an early stage, it is determined whether or not a detected or estimated catalyst temperature is greater than a predetermined activation temperature.

As a method of detecting or estimating the catalyst temperature, when, for example, a catalyst temperature sensor is provided, the catalyst temperature can be detected with the catalyst temperature sensor. An activation determination temperature at this time may be, for example, a predetermined temperature in a range of from 600° C. to 800° C. When a catalyst temperature sensor is not provided, the catalyst temperature can be estimated from the water temperature of the engine or based a combination of the engine water temperature when starting the engine and the intake air quantity after starting the engine.

Whether or not a request for activating a catalyst at an early stage is present can be determined based on whether or not, for example, a catalyst activation time has passed. A time from when the engine is started to when the catalyst is activated is set as the catalyst activation time. The catalyst activation time is a variable that is set based on, for example, a detected or estimated catalyst temperature or a retard amount. The lower the catalyst temperature or the retard amount, the longer the catalyst activation time. For example, a predetermined time of approximately 2 seconds to 30 seconds may be set.

In Step S15, the controller 50 sets the target fuel pressure to a target fuel pressure for retarded combustion. More specifically, the target fuel pressure is set with reference to the fuel pressure map for stratified combustion shown in FIG. 7. Although, in the embodiment, the target fuel pressure for retarded combustion is set using the fuel pressure map for stratified combustion because fuel is injected during the compression stroke, a fuel pressure map for retarded combustion as in FIG. 6, which is different from the fuel pressure map for stratified combustion as in FIG. 7, may be provided to thereafter set the target fuel pressure.

Figure 8:
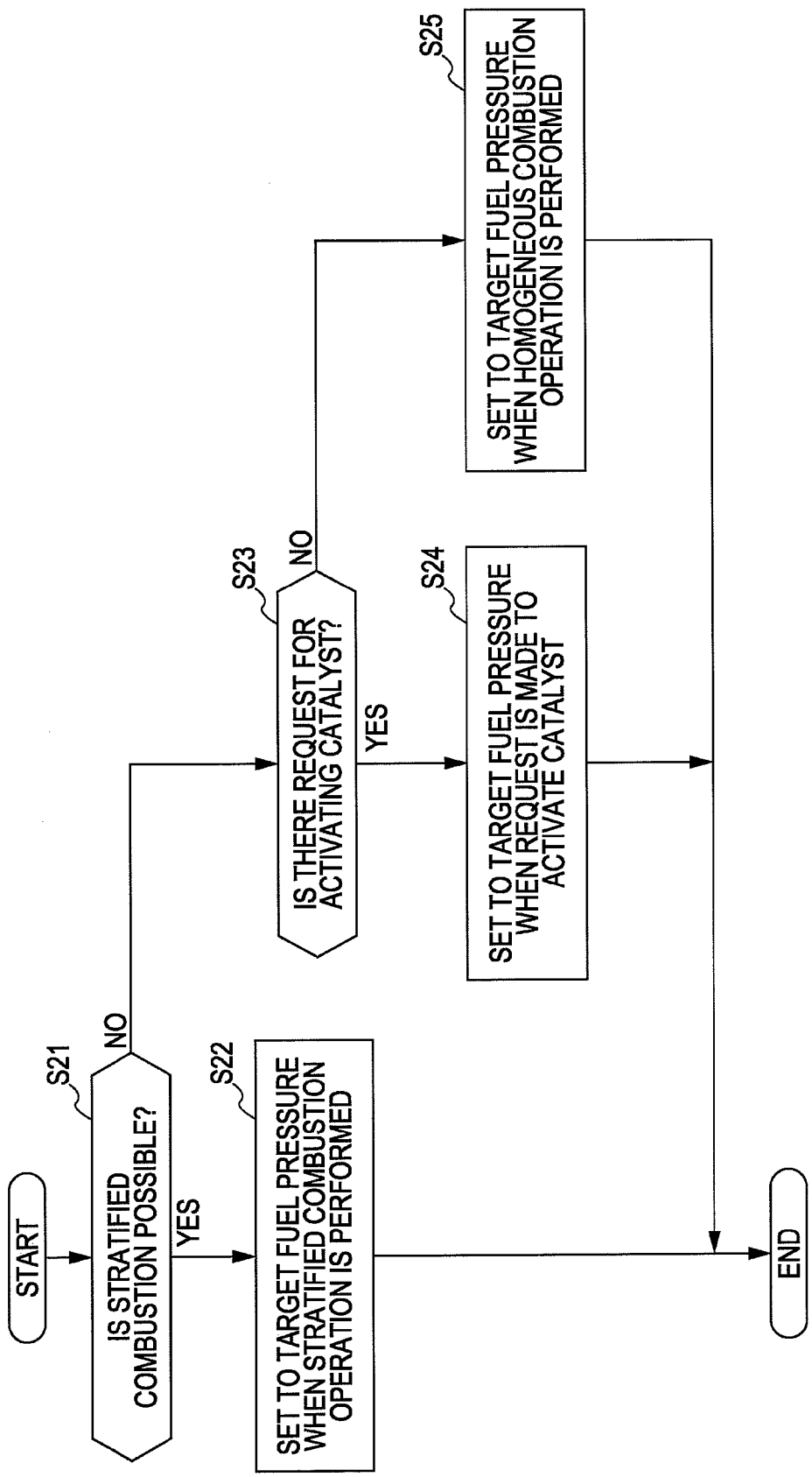
FIG. 8 is a flowchart illustrating a sequence of operation of a fuel pressure controlling device of the present invention the engine is operating at a higher rotational speed than idle operation, e.g., when a vehicle is traveling.

Next, a fuel pressure controlling operation of the engine when a vehicle is traveling will be described (i.e., when the engine has not just been started and is not in an idle operation). FIG. 8 is a flowchart illustrating an operation the fuel pressure controlling device of the engine when a vehicle is traveling. The controller 50 repeatedly executes this routine at a predetermined computation period.

In Step S21, the controller determines whether or not stratified combustion is possible. When a current operation area is a predetermined operation area in which the engine is operating at low speed and low load, and the water temperature of the engine is high, which is where stratified combustion is possible, the controller 50 causes the process to proceed to Step S22 to execute stratified combustion. In contrast, when the current operation area is a predetermined operation area in which the engine is operating at low speed, high load or at high speed, high load side, or when the water temperature of the engine is less than a predetermined temperature, the controller 50 causes the process to proceed to Step S23 to execute homogeneous combustion.

In Step S22, the controller 50 sets a target fuel pressure to the target fuel pressure for stratified combustion. More specifically, the target fuel pressure is set with reference to the fuel pressure map for stratified combustion shown in FIG. 7.

In Step S23, the controller 50 determines whether or not a request for activating the catalyst at an early stage is present. The method of determining whether or not a request for activating a catalyst at an early stage is present is as described in Step S14 with reference to in FIG. 5. When the controller 50 determines that a request for activating the catalyst at an early stage is present, the process proceeds to Step S24. In contrast, when the controller 50 determines that a request for activating the catalyst at an early stage is not present, the process proceeds to Step S25.

Figure 9:
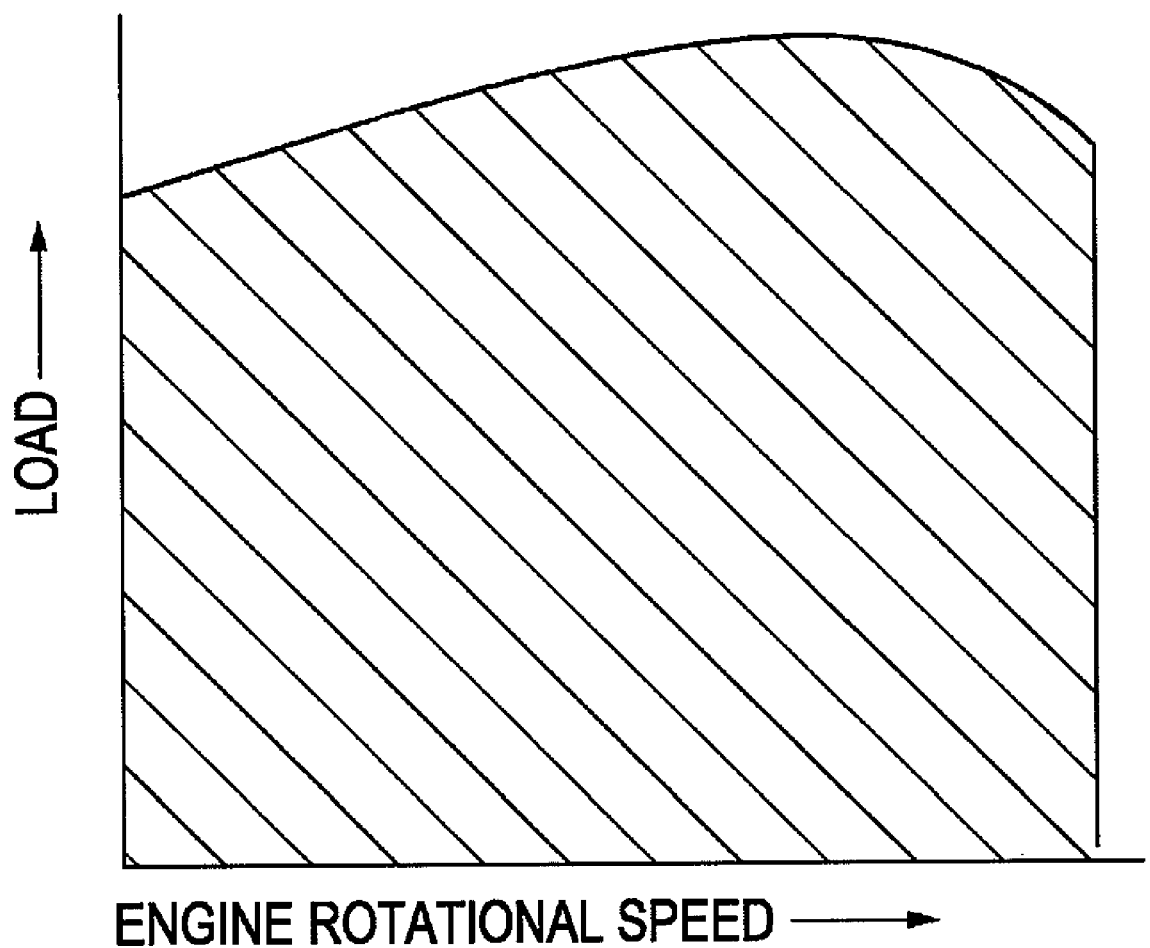
FIG. 9 is a fuel pressure map when a request for activating the catalyst is present.

In Step S24, the controller 50 sets the target fuel pressure to a target fuel pressure that is set when a request for activating the catalyst is present. More specifically, in principle, the target fuel pressure is set with reference to a fuel pressure map used when a request for activating the catalyst is present, as shown in FIG. 9. The fuel pressure map of FIG. 9 is a map for setting a constant target fuel pressure in every operation area. The target fuel pressure of the fuel pressure map is set equal to a fuel pressure value that is set for operating in a stratified combustion area. This makes it possible to prevent a time lag from occurring when the combustion mode is switched from homogeneous combustion to stratified combustion or retarded combustion.

However, since, in the fuel pressure map of FIG. 9, a constant target fuel pressure is set for every operation area, when the operation area is at high speed and high load, the target fuel pressure that is calculated with reference to the fuel pressure map for homogeneous combustion (as in FIG. 6) may be higher. In this case, the target fuel pressure that is calculated with reference to the fuel pressure map for homogeneous combustion is set to be higher.

In Step S25, the controller 50 sets the target fuel pressure to a target fuel pressure for homogeneous combustion. More specifically, the controller 50 sets the target fuel pressure with reference to the fuel pressure map for homogeneous combustion shown in FIG. 6.

FIG. 10 is a time chart illustrating the fuel pressure controlling operation of the engine according to an embodiment of the fuel pressure controlling device. For clarifying the correspondences of the time chart with the operation flowcharts of FIG. 5 and FIG. 8, FIG. 10 will be described by indicating the step numbers of the flowcharts of FIG. 5 and FIG. 8, as required.

At a time t1, if the water temperature of the engine is very low, i.e., if the water temperature is at a temperature that is less than or equal to a predetermined temperature, the controller determines that the engine can be started by stratified combustion ("Yes" in S11), and sets the target fuel pressure with reference to the fuel pressure map for stratified combustion ((B) in FIG. 10, S13).

At a time t2, when the actual fuel pressure reaches the target fuel pressure ((B) in FIG. 10), the controller starts the engine by stratified combustion ((A) in FIG. 10).

At a time t3, when a predetermined idle rotational speed is reached ((A) in FIG. 10), a request for activating the catalyst at an early stage is present ((C) in FIG. 10), so that the controller causes the combustion mode to switch from stratified combustion to retarded combustion ((D) in FIG. 10, "Yes" in S14), and to set the target fuel pressure to the target fuel pressure for retarded combustion ((B) in FIG. 10, S15). Since, in the embodiment, the target fuel pressure is set with reference to the fuel pressure map for stratified combustion, the target fuel pressure in retarded combustion remains the same as that for stratified combustion.

At a time t4, when the state of a vehicle becomes a traveling state, the combustion mode switches again to stratified combustion ((D) in FIG. 10, "Yes" in S21). Even at this time, the target fuel pressure is set with reference to the fuel pressure map for stratified combustion, so that the fuel pressure is maintained at the same value ((B) in FIG. 10, S22).

At a time t5, a high load state is set. When a command is given to switch from stratified combustion to homogeneous combustion ("No" in S21), the controller determines whether or not a request for activating the catalyst at an early stage is present (S23). At time t5, when a request for activating the catalyst at an early stage is present ((C) in FIG. 10), the controller sets the target fuel pressure to the target fuel pressure that is set when a request for activating the catalyst at an early stage is present (S24). Because the target fuel pressure is set with reference to the fuel pressure map used when a request for activating the catalyst is present, as shown in FIG. 9, the target fuel pressure remains the same as that when stratified combustion is performed ((B) in FIG. 10).

An operation of a system without a fuel pressure controlling device of the present invention is shown by broken lines in (B) in FIG. 10. Without a fuel pressure device of the present invention, when, at the time t5, the combustion mode is switched to homogeneous combustion, the target fuel pressure is set to a low fuel pressure value for homogeneous combustion in accordance with the switching of the combustion mode. In addition, an actual fuel pressure is subjected to a feedback control so as to follow the target fuel pressure. Therefore, when, at a time t6, a request is detected to be present to switch to stratified combustion, and the target fuel pressure is set again to a high fuel pressure value for stratified combustion, the combustion mode cannot be switched from the homogeneous combustion to the stratified combustion until a time t8, at which an actual fuel pressure reaches the target fuel pressure.

In contrast, in a system having an embodiment of a fuel pressure controlling device of the present invention, when a request for activating the catalyst at an early stage is present ((C) in FIG. 10, "Yes" in S23), even if, at the time t5, the combustion mode switches to the homogeneous combustion ((D) in FIG. 10), the high fuel pressure value for stratified combustion is set as the target fuel pressure (S24) as shown by the solid line in (B) in FIG. 10. Accordingly, when, at the time t6, a request is detected to be present for switching to the stratified combustion ("Yes" in S11 ), or when, at a time t7, a request is detected to be present for switching to retarded combustion ("Yes" in S14), the combustion mode can be immediately switched without waiting for the fuel pressure to rise. Therefore, no time lag occurs between when a request is detected to be present for switching the combustion mode and when the combustion mode is actually switched. Consequently, when a request for activating the catalyst at an early stage is present, retarded combustion can be performed at an earlier period. Thus, exhaust performance can be improved.

According to the embodiment described above, when a request is detected to be present for activating the catalyst at an early stage, even if homogeneous combustion is performed, a fuel pressure value for stratified combustion that is higher than a fuel pressure value that is set for ordinary homogeneous combustion is set as a target fuel pressure. Therefore, when a request is detected to be present for switching the combustion mode from homogeneous combustion to stratified combustion or retarded combustion, the fuel pressure is already set to the high fuel pressure for stratified combustion. Consequently, the combustion mode can be immediately switched without waiting for the fuel pressure to rise. That is, no time lag occurs between when a request is detected to be present for switching the combustion mode and when the combustion mode is actually switched. Therefore, when a request is detected to be present for activating the catalyst at an early stage, retarded combustion can be performed from an earlier stage. Consequently, exhaust temperature is raised to induce activation of the catalyst at an early stage, so that exhaust performance can be enhanced.

Performing homogeneous combustion under high fuel pressure is limited to when a request for activating the catalyst at an early stage is present. Therefore, efficiency loss due to using the high pressure fuel pump 26 to supply higher fuel pressure can be minimized.

The present invention is not limited to the above-described embodiment, so that it is obvious that various modifications can be made within the scope of the technical idea of the present invention. For example, in retarded combustion according to the embodiment, fuel is injected once during the compression stroke and again during the expansion stroke. However, the fuel may be injected once either during the compression stroke or during the expansion stroke. Alternatively, the fuel may be injected two times during the compression stroke.

While the invention has been disclosed with reference to certain preferred embodiments, numerous modifications, alterations, and changes to the described embodiments are possible without departing from the sphere and scope of the invention, as defined in the appended claims and equivalents thereof. Accordingly, it is intended that the invention not be limited to the described embodiments, but that it have the full scope defined by the language of the following claims.

What is claimed is:

1. A fuel pressure controlling device for a four stroke engine having a cylinder, the device comprising:
   a fuel injection device for injecting fuel into the cylinder;
   an ignition device for igniting a mixture of the injected fuel and air;
   a catalyst for removing pollutants from exhaust emitted by the engine; and
   a controller for controlling the fuel injection device and the ignition device, the controller being configured to select a combustion mode of the engine from at least a homogeneous combustion mode in which the fuel injection device injects the fuel during the intake stroke of the cylinder and the ignition device ignites the fuel before compression top dead center;
   wherein the controller is configured to control the fuel injection device to inject the fuel based on a target fuel pressure according to the selected combustion mode, and to detect whether or not a request is present for raising the temperature of the catalyst; and
   wherein in the homogenous combustion mode, when the controller detects that a request is present for raising the temperature of the catalyst, the controller sets the target fuel pressure to be a first target fuel pressure, and when the controller detects that a request is not present for raising the temperature of the catalyst, the controller sets the target fuel pressure to be a second target fuel pressure, the second target fuel pressure being lower than the first target fuel pressure.

2. The fuel pressure controlling device according to claim 1, wherein the controller is further configured to select the combustion mode from the homogeneous combustion mode, a stratified combustion mode in which the fuel injection device injects the fuel during the compression stroke and the ignition device ignites the fuel before compression top dead center, and a retarded combustion mode in which the fuel injection device injects the fuel during the compression stroke and the ignition device ignites the fuel after compression top dead center.

3. The fuel pressure controlling device according to claim 2, wherein the first target fuel pressure corresponds to a target fuel pressure required for operating the engine in the stratified combustion mode and the retarded combustion mode.

4. The fuel pressure controlling device according to claim 2, wherein the controller selects the combustion mode based on the rotational speed of the engine and the load on the engine, and whether or not a request is detected to be present for raising a temperature of the catalyst.

5. The fuel pressure controlling device according to claim 4, wherein the controller selects the homogeneous combustion mode when the rotational speed is above a predetermined speed threshold and the load is above a predetermined load threshold, the controller selects the stratified combustion mode when the rotation speed is below the predetermined speed threshold and the load is below the predetermined load threshold, and the controller selects the retarded combustion mode when the rotation speed is an idle speed and the request for raising a temperature of the catalyst is detected to be present.

6. The fuel pressure controlling device according to claim 1, wherein the first target fuel pressure increases as the rotational speed the engine increases.

7. The fuel pressure controlling device according to claim 1, wherein the first target fuel pressure increases as the load on the engine increases.

8. The fuel pressure controlling device according to claim 1, wherein after the engine is started and a request for raising a temperature of the catalyst is detected to not be present, the target fuel pressure for the homogeneous combustion mode is decreased.

9. A method of controlling the fuel pressure supplied to a four stroke engine having a cylinder, the method comprising:
   selecting a combustion mode of the engine from at least a homogenous combustion mode in which a fuel injection device injects fuel into the cylinder during the intake stroke of the engine and an ignition device ignites the fuel before compression top dead center;
   detecting whether or not a request is present for raising the temperature of a catalyst, the catalyst being provided for removing pollutants from exhaust emitted by the engine;
   injecting the fuel based on a target fuel pressure according to the selected combustion mode; and
   setting the target fuel pressure;
   wherein in the homogenous combustion mode, when a request is detected to be present for raising the temperature of the catalyst, the target fuel pressure is set to be a first target fuel pressure, and when a request is not detect to be present for raising the temperature of the catalyst, the target fuel pressure is set to be a second target fuel pressure, the second target fuel pressure being lower than the first target fuel pressure.

10. The method of controlling fuel pressure according to claim 9, wherein the combustion mode can be selected from the homogeneous combustion mode, a stratified combustion mode in which the fuel injection device injects the fuel during the compression stroke and the ignition device ignites the fuel before compression top dead center, and a retarded combustion mode in which the fuel injection device injects the fuel during the compression stroke and the ignition device ignites the fuel after compression top dead center.

11. The method of controlling fuel pressure according to claim 10, wherein the first target fuel pressure corresponds to a target fuel pressure required for operating the engine in the stratified combustion mode and the retarded combustion mode.

12. The method of controlling fuel pressure according to claim 10, wherein the combustion mode is selected based on the rotational speed of the engine and the load on the engine, and whether or not a request is detected to be present for raising a temperature of the catalyst.

13. The method of controlling fuel pressure according to claim 9, wherein the first target fuel pressure increases as the rotational speed the engine increases.

14. The method of controlling fuel pressure according to claim 9, wherein the first target fuel pressure increases as the load on the engine increases.

15. A fuel pressure controlling device for a four stroke engine having a cylinder, the device comprising:
fuel injection means for injecting fuel into the cylinder;
ignition means for igniting a mixture of the injected fuel and air;
a catalyst for removing pollutants from exhaust emitted by the engine; and
control means for controlling the fuel injection means and the ignition means, the control means selecting a combustion mode of the engine from at least a homogeneous combustion mode in which the fuel injection means injects the fuel during the intake stroke of the cylinder and the ignition means ignites the fuel before compression top dead center, the control means further detecting whether or not a request is present for raising the temperature of the catalyst;
wherein the fuel injection means is controlled to inject the fuel based on a target fuel pressure according to the selected combustion mode; and
wherein in the homogenous combustion mode, when a request is present for raising the temperature of the catalyst, the target fuel pressure is set to be a first target fuel pressure, and when a request is not present for raising the temperature of the catalyst, the target fuel pressure is set to be a second target fuel pressure, the second target fuel pressure being lower than the first target fuel pressure.

* * * * *